UNITED STATES PATENT OFFICE.

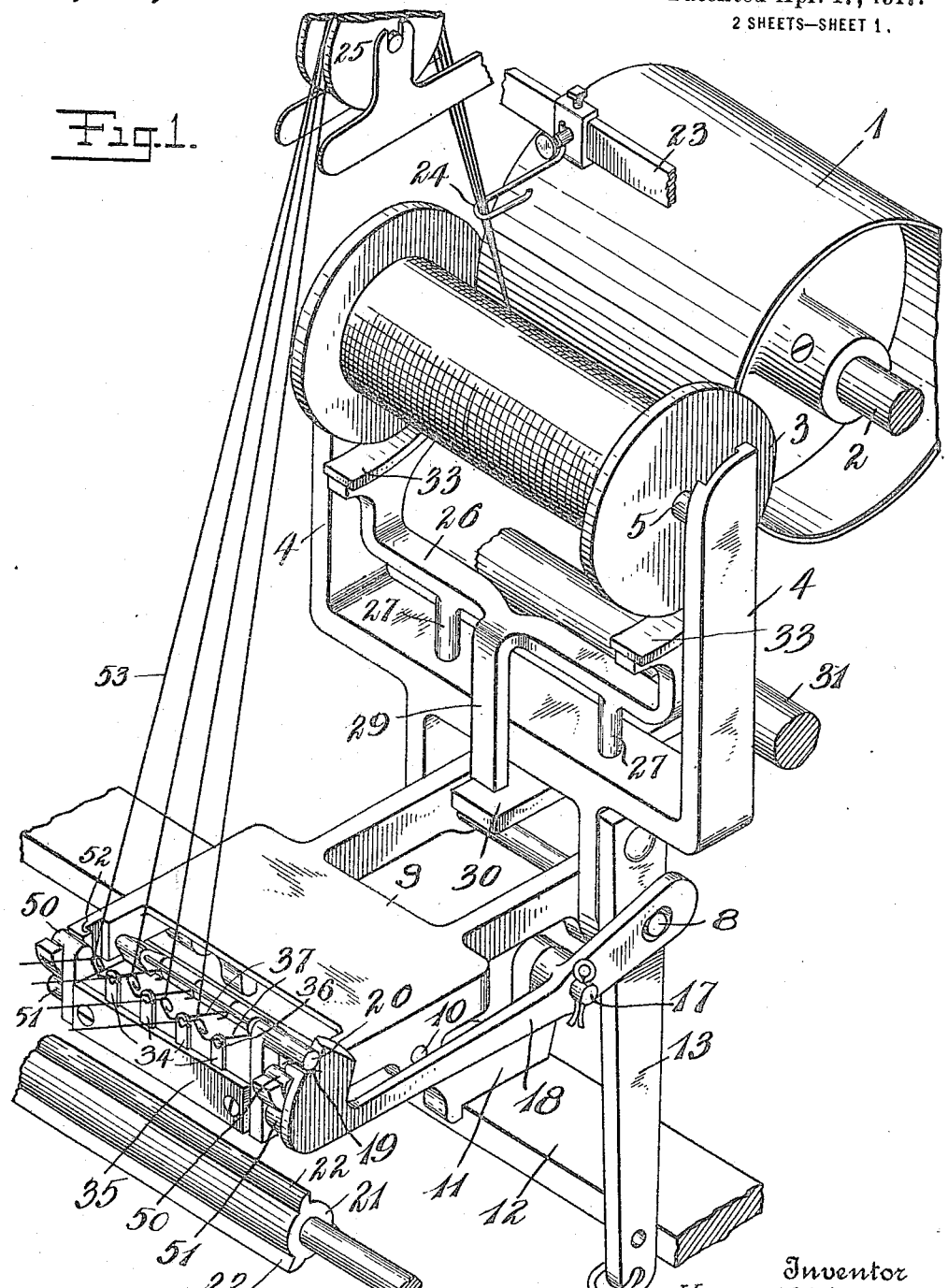

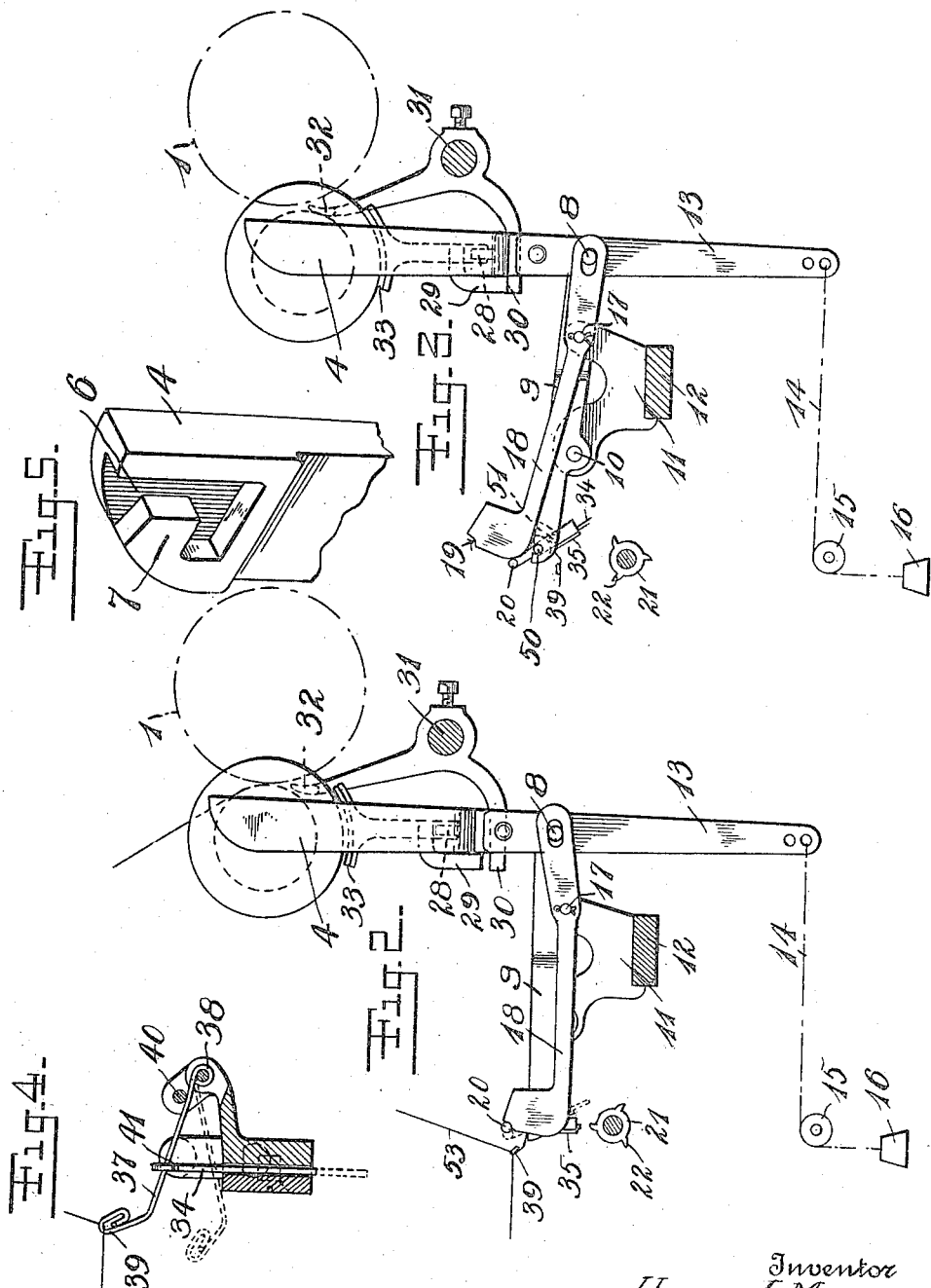

HENRY J. MARX, OF HOLYOKE, MASSACHUSETTS, ASSIGNOR TO THE AMERICAN THREAD COMPANY, OF JERSEY CITY, NEW JERSEY, A CORPORATION OF NEW JERSEY.

STOP-MOTION FOR DRUM-SPOOLERS.

1,222,962.

Specification of Letters Patent.

Patented Apr. 17, 1917.

Application filed January 14, 1916. Serial No. 72,003.

*To all whom it may concern:*

Be it known that I, HENRY J. MARX, a citizen of the United States, residing at Holyoke, Massachusetts, have invented a certain new and useful Improvement in Stop-Motions for Drum-Spoolers, of which the following is a full, clear, and exact description.

This invention relates to improvements in "drum spoolers" or "doublers" as used in the textile arts, and has for its object to provide a new and improved drum spooler, or doubler, having a brake, which, when the spool being wound is withdrawn from the driving drum, acts quickly and uniformly to check the rotation of the spool that would otherwise take place on account of its momentum. It further has for its object to provide a new and improved trip-box in which the pins which coöperate with the beater are not liable to be clogged by lint and are easily removable and replaceable.

The following is a description of an embodiment of my invention, reference being had to the accompanying drawings, in which—

Figure 1 shows in perspective one head of a doubler embodying my invention. Fig. 2 is a side view of the same on a reduced scale, showing the spool held in winding position. Fig. 3 is a similar view showing the spool withdrawn from winding position upon the breaking of a thread and a brake applied thereto by the means hereinafter described. Fig. 4 is a transverse sectional view of the trip-box, and Fig. 5 is a perspective view of the end of one of the uprights showing the bearing in which rotates the skewer upon which the spool is carried.

Referring more particularly to the drawings, 1 is a spool driving drum mounted upon the constantly rotating shaft 2. 3 is a spool supported in the uprights 4—4 of a spool carrying yoke. The spool is loosely mounted upon a wooden skewer 5 passing through its central hole and dropped into the counterpart slots 6 in the upper ends of the arms 4. These arms 4 tend to move toward the drum 1 so that the skewer is held beneath the projection 7 in the lower parts of the slots 6. The spool holding yoke is pivotally mounted upon the rod 8, supported by rearwardly extending arms of a frame 9, which is pivoted at 10 to a support 11 fixedly mounted upon a portion 12 of the frame of the machine. The spool carrying yoke is provided with a downwardly extending lever arm 13 to the lower end of which is attached a chain 14 which passes over a guide pulley 15 and is provided with a weight 16 at its lower end. This weight acting upon the arm 13 tends to move the upper ends 4 of the spool holding yoke toward the driving drum 1 and thus holds the spool in yielding engagement with the driving drum 1. Pivoted at 17 to the stationary portion 11 is a lever 18 whose rear end is provided with an elongated slot surrounding an extended portion of the rod 8. The front end of this lever 18 is provided with a recess 19 which is engaged and disengaged by an extension or lock pin 20 of the trip-box to be hereafter described in detail. Coöperating with the trip-box is a constantly revolving beater 21 rotating clockwise as shown in the drawings and provided with wings 22 for actuating the trip-box so as to cause it to release the lever 18. The trip-box is provided with trunnions or fulcrum pins 50 which turn in open bearings in the forward end of the frame 9. It is also provided with supplemental pins 51 which engage flanges 52 so as to prevent the trip-box from being lifted out of its bearings except when turned to approximately a horizontal position, in which position it can be easily lifted out.

The machine is provided with a traverse bar 23 which reciprocates to and fro and carries a thread guide 24 for determining the lay of the thread upon the spool. Each thread 53, before it passes through the guide 24, passes over a revolving guide wheel 25 mounted about midway of the spool. The parts thus far referred to, as far as described in detail, are old in spoolers of the prior art.

In the old spoolers where a multiplicity of yarn ends are being spooled together preparatory to twisting, it is essential that the separate ends of the threads 53 be kept under as nearly uniform tension as possible. To accomplish this any of the ordinary tension devices or resistances are employed, encountering the separate ends before they go into the drop wires to be fed to the spool. With such existing spoolers when an end breaks there is no positive method of stopping the spool from revolving under its own momentum after it leaves the driving drum so that a loose end is very liable to be wound into the goods on the spool, making it necessary for the operative to unwind this and tie the ends together again. It frequently happens that, due to the twisting in the yarn and the high speed of the spool, kinks are wound onto the spool when an end breaks which are not pulled out properly by the operative when piecing the ends together. The result of this is that an unequal tension prevails upon the ends being wound together. Furthermore it is evident that the less unwinding that has to be done from the spool, the easier it is for the operative to pick up ends without having to take care of a large quantity of loose yarn. The fact that the present method makes it necessary for the operative to pull out long lengths of yarn in order to get at the loose ends wound in, has been conducive to carelessness which results in tying of the ends together immediately they are found without going to the trouble of unwinding the spool so as to be sure that all the kinks and loops have been straightened out.

In order to obviate the difficulties just referred to, I have provided the spooler with a positive brake which acts to positively stop the spool as soon as it is withdrawn from the driving drum. This improvement consists in a brake yoke or member 26 carried by the spool holding yoke, being provided with downwardly extending tubular projections 27 fitting over upwardly extending pins 28 carried by the cross bar of the spool holding yoke and constituting rectilineal guiding surfaces for defining the path of movement of said brake yoke. This brake member is also provided with a downward projection 29 which, as the spool holding yoke is lowered, is adapted to engage a stationary anvil 30 carried upon a fixed portion 31 and provided as heretofore at its upper end with a separating shoe 32, which shoe acts to hold the spool away from the winding drum 1 when the spool holding yoke with its upwardly projecting arms 4 is lowered from its upward position. The anvil also as heretofore limits the downward movement of the spool holding yoke. The brake yoke is provided with leather contact shoes 33 which engage with and conform to the peripheries of both of the heads of the bobbin 3 so as to provide extended braking surfaces engaging the parts of the bobbin which are of the largest diameter, and therefore having maximum braking effect.

The old spoolers were also open to the objection that the trip-boxes employed drop-wires which were liable to be clogged and were not easily removed. In order to guard against this clogging I provide, instead of drop-wires, drop-pins 34 which fit closely within openings formed between the face plate 35 and the body of the trip-box so as to leave no space where lint can enter so as to interfere with their action, thus making them self-cleansing. These drop-pins are provided with C-shaped openings 36 at their upper ends through which pass spring wires 37 loosely mounted on a rod 38 and provided with pigtail thread guides 39. The threads 53 being wound pass through these pigtails holding the wires 37 up against a rod 40 and also holding the pins 34 normally in upward position as shown in Fig. 4. The rod 40 prevents the wires 37 from being lifted so high as to cramp the pins 34 and thus prevent them from acting properly and also causes the threads to hold the wires 37 under tension, so that upon the breaking of a thread the corresponding guide-wire drops with a quick snap action. Through the lateral slots 41 of the C-shaped openings wires 37 can be passed sidewise so as to be removed from the openings 36. The pins 34 can then be moved upward or downward so as to be removed from the trip-box. In this way the machine shown can be adapted to spool any number of threads from one to four inclusive. When the machine is operating properly the tension upon the threads being wound holds the wires 37 and pins 34 in their upward positions out of the way of the beater wings 22. If, however, any one of the threads breaks, the corresponding wire 37 drops down, releasing its pin 34 and also hitting it a slight blow which assists in lowering it to the position shown in dotted lines in Fig. 4, whereupon its lower end comes within the path of one of the beater wings 22 which gives it a blow and causes the trip-box to turn on its trunnions 50 so that the lock pin 20 is withdrawn from the notch 19 releasing the lever 18, which theretofore has held the spool holding yoke in operative position. Upon the releasing of this lever 18 the parts move to the position shown in Fig. 3 with the result that the spool is separated from the winding drum 1 by the separator 32 and moves toward the brake shoes 33 which brake shoes are prevented from moving with the spool-holding yoke by reason of the engagement of the projection 29 with the anvil 30. This brings the brake shoes 33 into close contact with the peripheries of the heads of the bobbin and results in the quick stoppage of its rotation.

It is to be noted that, inasmuch as the brake yoke always moves in a fixed path relatively to the spool-holding yoke, the leather shoes 33 which are shaped to the curvature of the spool, will always get a full bearing on the peripheries of the spool heads throughout the full length of the shoes, thus enabling a uniform braking action, irrespective of the amount of thread which may have been wound upon the spool.

With the trip-box in normal position, the lever 18 when once depressed is held down by the lock pin 20 and the spool bears against the driving drum 1. In the event of a thread end breaking the corresponding drop pin 34 falls, and, being struck by the beater, causes the trip-box to turn on its trunnions 50 so that the lock pin 20 releases the lock lever which permits the spool carrying yoke and the attached parts to drop so that the spool is withdrawn from the driving drum and the downward projection 29 upon the brake yoke strikes the anvil 30 causing the brake shoes 33 to press against the peripheries of the spool heads, stopping the spool immediately and thus preventing the broken end of the yarn from being pulled over the guide pulley 25 and wound into the spool. When the drop-pin which fell when the end broke is again brought back into normal position and held there by the thread, the locking lever 18 can be forced down so that the locking pin 20 again engages it, thus holding the spool off the brake shoes and away from the separator so that the driving drum will again revolve it. This certainty of action on the part of the drop-pins 34, together with the quick stopping of the bobbin which results from my improvements above described, removes the difficulties hereinbefore referred to and results not only in a superior product, when machines are run by more or less careless operators, but in a saving of material and of time, even on the part of the most skilled operator.

As will be evident to those skilled in the art, my invention permits of various modifications without departing from the spirit thereof or the scope of the appended claims.

What I claim is:

1. In a drum spooler, the combination of a driving drum, a spool holding yoke, a brake shoe carried and normally supported by said yoke and movable relatively thereto, adapted to be engaged by the spool when the spool is withdrawn from said driving drum, means for causing said spool to be withdrawn from said drum upon the breaking of a thread being wound thereon, and a fixed anvil, said brake shoe having a depending portion adapted to engage said anvil when said spool is withdrawn from said driving drum, the movement of said spool causing it to engage said brake shoe when held from moving by said anvil.

2. In a winding machine the combination of a drum, a vertically and laterally movable spool-holder normally tending to move downward away from said drum and also laterally toward said drum, trip-mechanism normally holding said yoke in elevated position, means for holding the spool in said yoke away from said drum when said yoke is released by said trip-mechanism, a brake carried by said yoke and movably mounted upon the same, and means for stopping the downward movement of said brake before the limit of the downward movement of said yoke is reached, so as to cause braking engagement with said spool.

3. In a winding machine the combination of a drum, a vertically and laterally movable spool-holder normally tending to move downward away from said drum and also laterally toward said drum, trip-mechanism normally holding said yoke in elevated position, means for holding the spool in said yoke away from said drum when said yoke is released by said trip-mechanism, a brake carried by said yoke and movably mounted upon the same, and means for stopping the downward movement of said brake before the limit of the downward movement of said yoke is reached, so as to cause braking engagement with said spool, said yoke and said brake having substantially vertical guiding surfaces so that they move relatively to each other in a substantially vertical plane.

4. In a winding machine a trip-box having vertical trip-pin guiding openings, vertical trip-pins fitting within said openings and having transverse holes in their upper ends, pivotally mounted guide wires passing loosely through said holes and normally supporting said pins, said holes being substantially in line with the pivots and guide loops of said guide wires and between the same, a beater adapted to engage said trip-pins when said trip-pins and guide wires are in depressed position and a bar above said guide wires and removed from the guide loops thereof so as to be between said pivots and said trip-pins, and normally limiting the upward movements of said guide wires and holding them under tension against the pull of the threads passing therethrough.

5. In a drum spooler, a trip-box having trip pin openings, trip pins fitting closely within said openings, said trip pins having openings in their upper ends, pivotally mounted guide wires extending through said openings, and a beater adapted to engage said trip pins when said pins and guide wires are in depressed position, said openings in said trip pins being cut away at one side so as to permit the easy removal of said guide wires therefrom and the subsequent withdrawal of said pins.

6. In a drum winding-machine, the combination of a drum, a spool-holding yoke tending to move toward said drum, means for supporting said yoke so that it is movable substantially in a vertical plane and can oscillate toward and from said drum, a fixed guide for holding a spool, carried by said yoke, away from said drum when said yoke is in depressed position, a brake shoe and carrier therefor normally supported by said yoke and movable relatively thereto, a fixed abutment engaging said carrier and causing said brake shoe to move relatively to said yoke in engagement with said spool when said yoke moves downward, a detent for holding said yoke in elevated position and means for releasing said detent upon the breaking of a thread being wound upon said spool.

HENRY J. MARX.

Copies of this patent may be obtained for five cents each, by addressing the "Commissioner of Patents, Washington, D. C."